UNITED STATES PATENT OFFICE.

JULIUS ABEL AND FRITZ KALKOW, OF LUDWIGSHAFEN, GERMANY, ASSIGNORS TO THE BADISCHE ANILIN AND SODA FABRIK, OF SAME PLACE.

BLACK SULFUR DYE.

SPECIFICATION forming part of Letters Patent No. 650,293, dated May 22, 1900.

Application filed March 13, 1900. Serial No. 8,473. (No specimens.)

*To all whom it may concern:*

Be it known that we, JULIUS ABEL, doctor of philosophy, a citizen of the free Hansa town of Hamburg, and FRITZ KALKOW, doctor of philosophy, a subject of the King of Prussia, Emperor of Germany, both residing at Ludwigshafen-on-the-Rhine, in the Kingdom of Bavaria and Empire of Germany, have invented new and useful Improvements in Black Coloring-Matters, of which the following is a specification.

Our invention relates to the production of black coloring-matter, with a green cast, directly dyeing cotton, which can be obtained by heating certain diphenylamin derivatives with sulfur and an alkaline sulfid. The said diphenylamin derivatives can be obtained, as we have discovered, by heating one molecular proportion of a para-hydroxy-ortho-para-dinitro-diphenylamin body—such, for example, as the condensation product of meta-dinitro-chlorbenzene and para-amido-phenol (which is described by Nietzki and Simon, *Berichte der Deutschen Chemischen Gesellschaft*, 1895, p. 2973) or para-amido-phenol-ortho-sulfoacid—with one molecular proportion of meta-dinitro-chlorbenzene, for example, in aqueous solution in the presence of about one molecular proportion of carbonate of soda or caustic soda. If preferred, however, the intermediate condensation product of one molecule of the para-amido-phenol body and one molecule of dinitro-chlorbenzene need not be isolated, but the amido-phenol body can at once be treated with two molecular proportions of dinitro-chlorbenzene. Judging from the method of formation these compounds possess the constitution represented by the following formula:

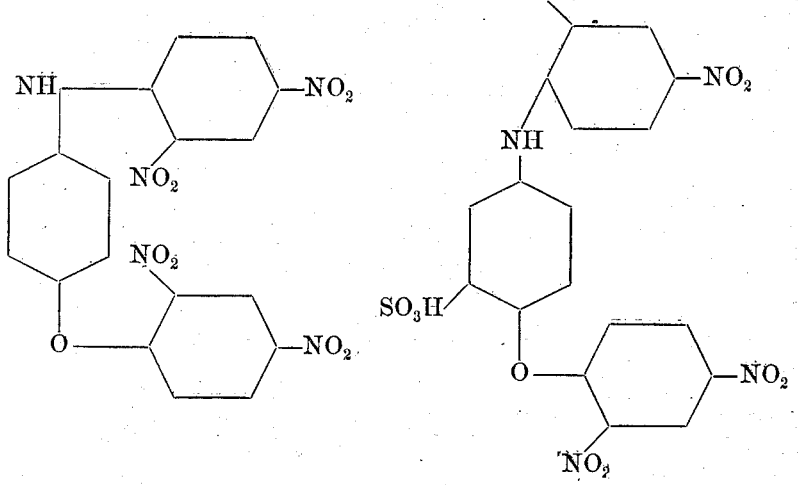

and are accordingly derivatives of nitrated phenol ethers. Other similar phenol-ether derivatives which are suitable as initial material for the manufacture of our new coloring-matters can be obtained by heating para-hydroxy-ortho-para-dinitro-diphenylamin derivatives with ortho-nitro-chlorbenzene-para-sulfoacid or with para-nitro-chlorbenzene-ortho-sulfoacid. These bodies would presumably have the constitution indicated by the following formulæ:

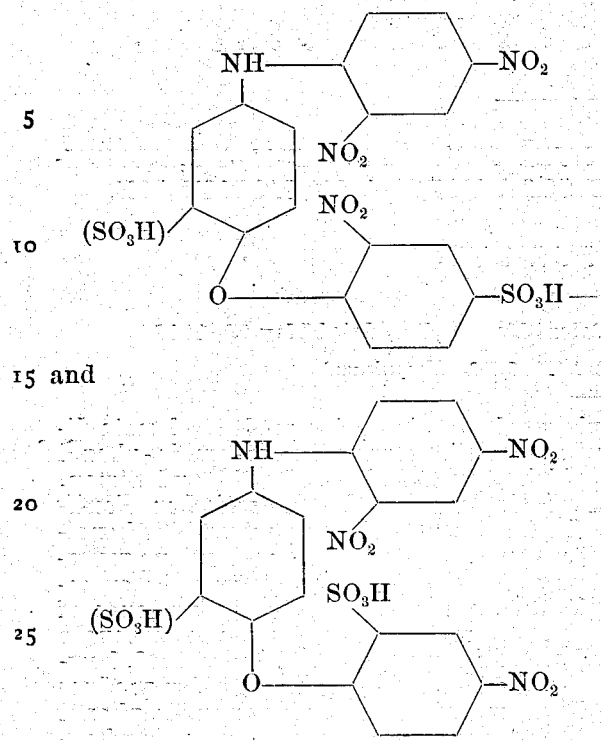

and (with or without the SO₃H group inclosed in brackets.)

The shades which our new coloring-matters give are black, with a greenish cast characterized by considerable beauty and excellent fastness. Treatment with bichromate and sulfuric acid in the well-known manner renders them bluish black. The following example will serve to illustrate the nature of our invention and how it may be carried into practical effect. The parts are by weight.

*Production of a new black coloring-matter.*— Mix together about forty (40) parts of the sodium salt of para-dinitro-phenoxy-ortho-para-dinitro-diphenylamin-meta-sulfoacid with eighty (80) parts of sulfur and two hundred (200) parts of crystallized sodium sulfid. Heat this mixture in an iron pot furnished with a stirrer at a temperature of about 140° centigrade. When the mass no longer froths up, but turns solid, the reaction may be regarded as ended. Allow to cool and reduce it to powder. This powder can be directly used for dyeing.

In a similar manner coloring-matters are obtained from the other new condensation products hereinbefore indicated. Of course the conditions of working, such as the temperature of melting, can be varied in all cases without departure from the nature of our invention.

Our new coloring-matter, which can be thus obtained, is a dark powder readily soluble in water, giving a blue-green solution, from which common salt and ammonium chlorid precipitate blue-green flocks. On unmordanted cotton our new coloring-matter produces green-black shades, which possess extraordinary fastness to acids, alkalies, and soap. Upon treatment with bichromate and sulfuric acid beautiful bluish-black shades are obtained, which resist to an excellent degree the action of soap, chlorin, and sulfur dioxid.

Now what we claim is—

As a new product the dyestuff which can be obtained by treating a specified diphenylamin derivative with sulfur and sodium sulfid, which coloring-matter is soluble in water with a blue-green color, and is precipitated from this solution by common salt in blue-green flocks and dyes unmordanted cotton in green-black shades of great fastness to acids, alkalies and soap, which on treatment with bichromate and sulfuric acid are turned blueish-black and resist to a high degree the action of soap, chlorin and sulfur dioxid.

In testimony whereof we have hereunto set our hands in the presence of two subscribing witnesses.

JULIUS ABEL.
FRITZ KALKOW.

Witnesses:
J. L. HEINKE,
F. F. NESSELER.